United States Patent [19]
Brich et al.

[11] Patent Number: 4,949,237
[45] Date of Patent: Aug. 14, 1990

[54] DIGITAL INTEGRATING MODULE FOR SAMPLING CONTROL DEVICES

[75] Inventors: Peter Brich, Herzogenaurach; Franz Kolb, Offenburg; Siegfried Oblasser, Erlangen, all of Fed. Rep. of Germany

[73] Assignee: Siemens Aktiengesellschaft, Berlin & Munich, Fed. Rep. of Germany

[21] Appl. No.: 272,774

[22] PCT Filed: Mar. 2, 1988

[86] PCT No.: PCT/EP88/00154

§ 371 Date: Oct. 12, 1988

§ 102(e) Date: Oct. 12, 1988

[87] PCT Pub. No.: WO88/07230

PCT Pub. Date: Sep. 22, 1988

[30] Foreign Application Priority Data

Mar. 9, 1987 [DE] Fed. Rep. of Germany ....... 3707498

[51] Int. Cl.$^5$ .................. G05B 13/04; G05B 21/02
[52] U.S. Cl. .................................... 364/178; 364/149; 364/194

[58] Field of Search ............... 364/178, 179, 148–152, 364/176, 177, 160–165, 183, 194; 318/561

[56] References Cited

U.S. PATENT DOCUMENTS

| | | | |
|---|---|---|---|
| 4,358,822 | 11/1982 | Sanchez | 364/178 X |
| 4,674,029 | 6/1987 | Maudal | 364/178 X |
| 4,774,651 | 9/1988 | El-Ibiary et al. | 364/178 X |
| 4,791,548 | 12/1988 | Yoshikawa et al. | 364/178 X |

*Primary Examiner*—Joseph Ruggiero
*Attorney, Agent, or Firm*—Kenyon & Kenyon

[57] ABSTRACT

An integrating module which can be fed back and operates recursively according to the trapezoidal rule, across which a pass-through value channel is shunted. For feeding back the module a separate feedback output is provided at which the output signal of the internal rectangle rule integrating module is available for feedback. The deviation between the output signal proper of the module and the signal at the feedback output is corrected separately outside the feedback branch. In one embodiment, the correction is brought about by a suitable adjustment of an amplifier in the channel of the input variable.

3 Claims, 3 Drawing Sheets

DIGITAL INTEGRATING MODULE FOR SAMPLING CONTROL DEVICES

BACKGROUND OF THE INVENTION

The present invention relates to an integrating module for sampling control devices that can be fed back and in which the relationship between the input and the output signal at any sampling point is determined by a recursive integrating algorithm which is formed by approximation of the area under a continuous function by means of the trapezoidal rule.

The use of process computers and microprocessors in the control and automation of technical systems which are characterized by a high processing rate and a large storage and address space forms the technical foundation for the realization of high performance control systems. A prerequisite for the full utilization of such computers, however, is a sufficiently accurate physical/mathematical description of the loop to be controlled, for instance, in the form of a so-called "model". As is well known, the dynamic behavior between the inputs and outputs of a loop can be described in general by a set of differential equations of different order and of ordinary equations which were derived by utilizing the physical laws occurring in the respective system.

For the uniform mathematical description of such sets of equations and their formal standardized treatment up to the design and layout of suitable control strategies based thereon essentially two methods have evolved in modern control engineering. One of them is the well-known "frequency domain method", in which the system equations are transferred from the time domain into the frequency domain. The dynamic system behavior can be further processed there in the form of complex transfer functions up to the design and layout of suitable control systems.

A second method for the uniform mathematical description which has not been popular generally yet is the system representation in the so-called "state space." There, the system equations which as a rule are of different order are transferred in the time domain into a first-order set of differential equations by a suitable definition of the state variables. All input, output and state variables of the system can them be combined advantageously in vectors which are generally interlinked via a so-called "system, input, output and passthrough matrix." Besides the simple mathematical processing of such a system description by means of matrix calculus, it is a further advantage of the state space representation that the state equations, assuming linearity and time invariance, can be converted into so-called "normal forms" by means of standardized transformations. While these describe the same physical system and thus represent equivalent descriptions of the respective dynamic system behavior, certain structure properties of the system to be modulated, for instance, their eigen values, their controllability or observability, emerge particularly clearly only after the transformation of the state equations into one of the standard forms. The standard forms thus are a particularly suitable starting point for design of control strategies or control structures. Thus, for instance, the actual state of a concrete system can be simulated in an "observer" which "runs along", for instance, in a computer, and is modelling the system so that this "internal" state of the system becomes accessible and can be influenced by means of suitable control interventions: known standard/forms are, for instance, the so-called "Jordan standard form" and various "observer and control standard forms."

The description of the system by means of state equations or its representation in a selected standard form has the further advantage that it can be realized particularly well in analog and digital computers. This system description has therefore a decisive importance for a practical realization of technical sampling control devices. The good handling capability is made possible particularly by the provision that the normal forms lead to a standardized, block-oriented modular system representation. The number of such "blocks" required for the modelling of a technical system is directly dependent on the order of the system present, so that matching of the scope of the standard form required in each case to a changed "system order" is possible in a simple manner by adding or omitting one or several blocks. A further advantage in the technical realization of this system description is that all blocks are designed identically in one of the standard forms and are given in the core one integrator each in the representation in the time domain. Thus, for instance, a system model designed in accordance with the Jordan standard form consists of the parallel connection of a number corresponding to the respective system order of integrators provided with coefficient setters which can be fed back separately. The complex system behavior is therefore simulated by the superposition of the reaction of first-order subsystems. Accordingly, a system model designed according to an observer or control standard form consists of the series connection of a number of integrators corresponding to the respective system order and which are all fed back together via coefficient setters. Here, too, the complex system behavior is composed of the reaction of first-order subsystems.

It is known to simulate in the practical technical design of such system models or of "observers" based thereon the integrator required as a component in a digital control and automating device by means of a recursively operating algorithm. In the process, the actual values of the input variables are determined at each sampling point and therefrom, actual output values are determined with the aid of variables which were determined, calculated and interim-stored, at the preceding sampling point. In a known algorithm for simulating an integrator, the area under a continuous time function is approximated by means of the so-called "rectangle rule." For the latter, the relationship applies $v_k = v_{k-1} + T_A/T_I \cdot u_{k-1}$ with $v_k$: output signal at the $k^{th}$ sampling instant $v_{k-1}$: output signal at the $(k-1)^{th}$ sampling instant $u_{k-1}$: input signal at the $(k-1)^{th}$ sampling instant $T_A$: sampling time $T_I$: integrating time constant which can be found, for instance, in the book by Norbert Hoffmann, "Digitale Regelung mit Mikroprozessor", Vieweg Verlag, 1983, on page 23, bottom. A "rectangle rule integrating module" operating recursively according to the equation above has the advantage that it can be fed back and thus can be used as a component, for instance, in the above-described standard forms in the representation of state space of technical systems. The rectangle rule integrating module, however, has on the one hand the disadvantage that it carries out the I- approximation only with a permanent mean area error. In particular, it is a further disadvantage that, for instance, when such an integrating module is set in operation at the sampling point $k-1$ ($v_{k31}1 = u_{k-1} = 0$), an output signal $v_k$ is available only after the end of a sampling time $T_A$ at the following sampling instant k by weighting the input value $u_{k-1}$ which was sampled for the first time at the preceding sampling instant $k-1$ with $T_A/T_I$. This in turn has the disadvantage, for instance, in an observer constructed according to a standard observation or control form, that a change of the input signal has traversed all series-connected integrating modules only after a number of sampling times corresponding to the order of the system and has "arrived" completely at the output of the observer. In a system model designed in this manner, a considerable reaction time must therefore be expected. It has been found that, for preserving the stability, the minimum system time constant to be simulated of the rectangle rule/integrating module must be larger at least by a factor 2 than the sampling time $T_A$ present in every case.

For dynamicizing such a modular automating system, two approaches are available. For one, the sampling time can be reduced so far that sufficiently small integration time constants can be adjusted while preserving the above-mentioned ratio to the actual magnitude of the sampling time $T_A$. It speaks against such a procedure that the sampling time of a sampling time control system is limited by its internal design and organization, and such a system is already operated as a rule with the longest possible adjustable sampling time for reasons of accuracy.

Another approach for dynamicizing a sampling control system consists of the use of more powerful algorithms which permit a more advantageous ratio of the system time constant or integration time constant to the sampling time present. Particularly with a system description by means of the state space methods, this means the use of an improved algorithm for the numerical integration. Thus, it is known to approximate the area under a continuous function by means of the so-called trapezoidal rule. An integrating algorithm formed therefrom is considerably more powerful than the known rectangle rule algorithm and is described, for instance, in the book by Wolfgang Latzen, "Regelung mit dem Prozessrezhner", P.I. Wissenschaftsverlag, 1977, particularly on pages 79 to 91.

Thus, the relationship $$V_k = V_{k-1} + d_o \cdot (u_{k-1} + U_k)$$

applies for the integrating algorithm according to the trapezoidal rule where $d_o = T_A/2 \cdot T_I$ $T_A$: sampling time
$T_I$: integrating time constant
$v_k$: output signal at the $k^{th}$ sampling instant
$v_{k-1}$: output signal at the $(k-1)^{th}$ sampling instant
$u_k$: input signal at the $k^{th}$ sampling instant
$u_{k-1}$: input signal at the $(k-1)^{th}$ sampling instant It can be seen from this equation that also with a start of the algorithm, for instance, at a sampling point k, an output value $d_o \cdot u_k$ can be expected immediately although at this instant no values $v_{k-1}$ and $u_{k-1}$ from a preceding sampling are yet available. In contrast to the integrating algorithm according to the rectangle rule, an integrating algorithm according to the trapezoidal rule "reacts" considerably faster to changes of the input signals. It can further be shown that the mean area error in numerical integration by means of the trapezoidal rule is always equal to zero while in numerical integration by means of the rectangle rule, it increases with the sampling time.

A condition for the use of integrating modules in a modular system model which is constructed, for instance, in accordance with one of the known standard forms is the capability of random wiring and in particular, feedback. An integrating module constructed according to the trapezoidal rule which operates recursively on the other hand cannot be fed back. The reason for this is that a change of the input value has a direct effect as a so-called "pass through value" without delay and thus, via the feedback, again without delay on the input value and so forth. If it is attempted nevertheless to feed back a trapezoidal rule integrating module, an equation is obtained which itself requires, for the calculation of the actual output value at the respective sampling point, this output value still to be calculated. Thus, no logical and feasible algorithmic sequence in the processing of the individual terms of this equation is obtained. If such an element is forcibly fed back in a computer, the recursive calculation would abort immediately. A basic condition for discretizing a continuous system by an algorithm, however, consists exactly in the fact that it can be calculated recursively at the sampling points.

SUMMARY OF THE INVENTION

It is an object of the present invention to describe an integrating module, the internal recursive processing algorithm of which is formed by the approximation of an area by means of the trapezoidal rule and can be fed back while the known dynamic properties of the trapezoidal rule algorithm are preserved. The above and other objects of the invention are achieved by an integrating module for a sampling control device which can be fed back and in which the relation between the input and the output signals at every sampling instant is determined by a recursive integrating algorithm which is formed by the approximation of the area under a continuous function by means of the trapezoidal rule, comprising:

an internal rectangle rule integrating module, in which the relationship between the input and the output signal at every sampling instant is determined by a recursive integrating algorithm which is formed by the approximation of the area under a continuous function by means of the rectangle rule, wherein a first amplifier which weights the input signal of the integrating module with a first factor $d_o = T_A/2 \times T_I$, where $T_A$=sampling time and $T_I$=integration time constant and makes it available as the input signal for the internal rectangle rule integrating module and as a pass-through value; a first adder which forms as the output signal of the integrating module the sum of the pass-through value and twice the output signal of the internal rectangle rule integrating module;

a separate feedback output at which twice the output signal of the internal rectangle rule integrating module is delivered; and means for correcting the deviation of the signal at the feedback output from the output signal if feedback from the feedback output to the input of the integrating module is present.

BRIEF DESCRIPTION OF THE DRAWINGS

The invention will be described in greater detail in the following detailed description with reference to the drawings, in which.

DETAILED DESCRIPTION

Figure 1:
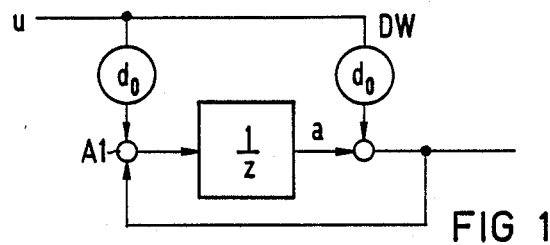
FIG. 1 shows the structure of an integrating module operating recursively according to the trapezoidal rule in the so-called "observer standard form"

FIG. 1 shows the known structure of an integrating module operating recursively according to the trapezoidal rule at the sampling points, which is constructed on the basis of the "observer standard form". The element $1/z = e^{31 p \cdot T_A}$ of FIG. 1 which is known from the theory of linear sampling controls and serves as the basis of the so-called "ztransformation" represents in the practical implementation in a digital computer a memory or a dead-time stage. The latter reads the value $V_{K-1} + d_o \cdot U_{K-1}$ present at the input at a sampling instant $k-1$, holds it for the duration of a sampling time $T_A$ and reads the latter out, finally, at the following sampling instant $k$ at the output as the value a. The integrating algorithm according to the trapezoidal rule, already referred to above, can therefore be represented as follows, taking the presentation of FIG. 1 as the base:

$$V_k = a + DW$$

$$V_k = (v_{k-1} = d_o \cdot U_{K-1}) + d_o \cdot U_K$$

with DW: pass-through value.

As was already explained above, the output signal $v_k$ of this trapezoidal rule integrating module cannot be fed back directly to the input signal $u_k$. In order nevertheless to achieve feedback capability of this element, while preserving the "input/output behavior" according to the present invention, it is advantageous to first perform some internal restructuring, which is shown in FIGS. 2 and 3.

Figure 2:
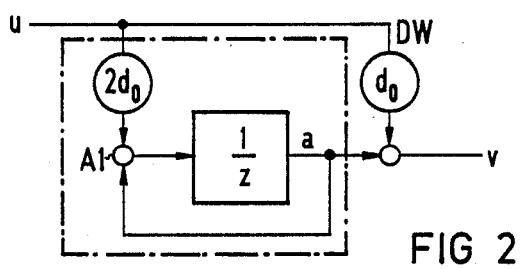
FIG. 2 shows a further modified structure of the module of FIG. 1.

Thus, the structure of FIG. 1 can be transformed in a first step into the equivalent structure according to FIG. 2 by, for one, no longer feeding back the output signal $v_k$, but the output signal a of the dead-time stage $1/z$ to the addition point A1. For compensation for the now no longer fed-back pass-through value $DW = d_o \cdot u_k$, the input value $u_k$ is now fed, provided with a factor 2, to the adding point A1. The equivalence of the structures of FIGS. 1 and 2 can be recognized easily by the fact that the value $$d_o \cdot U_k + d_o \cdot U_K$$

is fed to the addition point A1 in both cases. It can be shown that the part surrounded by a dash-dotted line in FIG. 2, corresponds to a "rectangle rule integrating module" constructed according to the rectangle rule.

Figure 3:
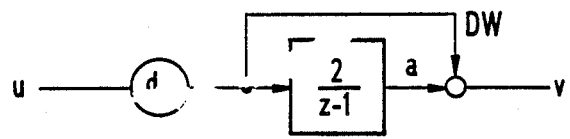
FIG. 3 shows a further modified structure of the module of FIG. 2.

A further modification is shown in FIG. 3, where the dash-dotted part of FIG. 2 has been combined in an overall element in accordance with the following calculation $$2 \cdot d_o \cdot \frac{1/z}{1 - \frac{1}{z}} = d_o \cdot \frac{2}{z - 1}$$

Furthermore, the gain $d_o$ residing in the pass-through value channel DW and in the input channel of the rectange rule integrating module is pulled forward into the input variable channel for a direct weighting of the input variable $u_k$. Due to the preceding transformations, the structure of FIG. 1 has therefore been resolved into an internal component operating in accordance with the rectangle rule, which is provided with a pass-through value channel DW in such a manner that the overall structure behaves unchanged like a trapezoidal rule integrating module.

According to the present invention, the structure of a trapezoidal rule integrating module found in FIG. 3 is fed back in such a way that even so, recursive algorithmic processing in a sampling control system is possible. For this purpose, only that part of the structure of FIG. 3 is fed back which is capable of being fed back, according to the invention, in a first step. As already explained above, the rectangular rule integrating module can be fed back without reservation. For this reason the output of the internal rectangle integrating module $I_{RE}$ serves, according to the presentation of FIG. 4, as a separate feedback output AR. Thus, if required, a feedback branch RZ is brought from this output AR via a feedback amplifier which makes a weighting coefficient h available, to the input of the trapezoidal rule integrator module according to the invention. In a second step, the deviation, present with such a feedback between the output signal $v_k$ proper and the signal at the feedback output AR is compensated. There are several possibilities for this. In the embodiment of the invention according to FIG. 4, one of the possibilities is shown. The pass-through value DW not contained in the fed back intermediate value a is provided with the weighting factor h present in the feedback branch RZ, bypassing the internal rectangle rule integrating module $2/(z-1)$ and is fed back separately to the input of the trapezoidal-rule integrating module according to the invention.

Figure 4:
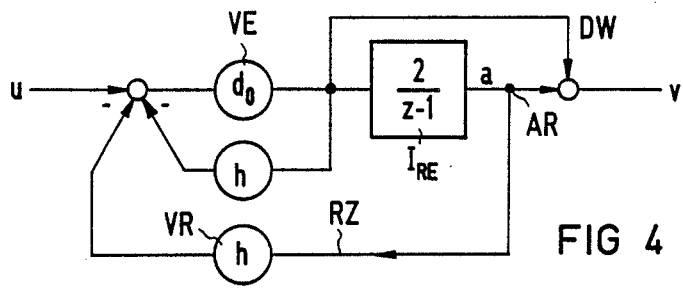
FIG. 4 shows an embodiment of the feedback of the trapezoidal rule integrating module of FIGS. 2 or 3, respectively, according to the present invention.
Figure 5:
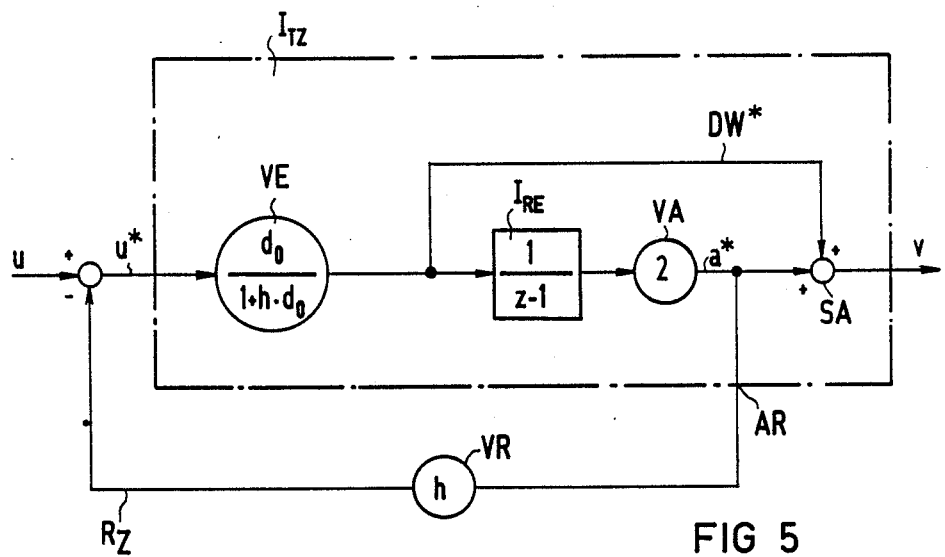
FIG. 5 shows a further embodiment of the trapezoidal rule integrating module according to the invention which can be fed back.

In the embodiment of the invention according to FIG. 5, a further possibility for correcting the deviation of the signal at the feedback output AR from the output signal v of the trapezoidal rule integrating module $I_{TZ}$ according to the invention is shown. The correction is accomplished here directly through a suitable choice of the weighting factor for the input signal u made available via a first amplifier VE. The former is obtained by a direct combination of the factors $d_o$ and h of the elements V and VE* of the opened feedback loop in FIG. 4 as $$d_o/(1 + h \cdot d_o)$$

Figure 6:
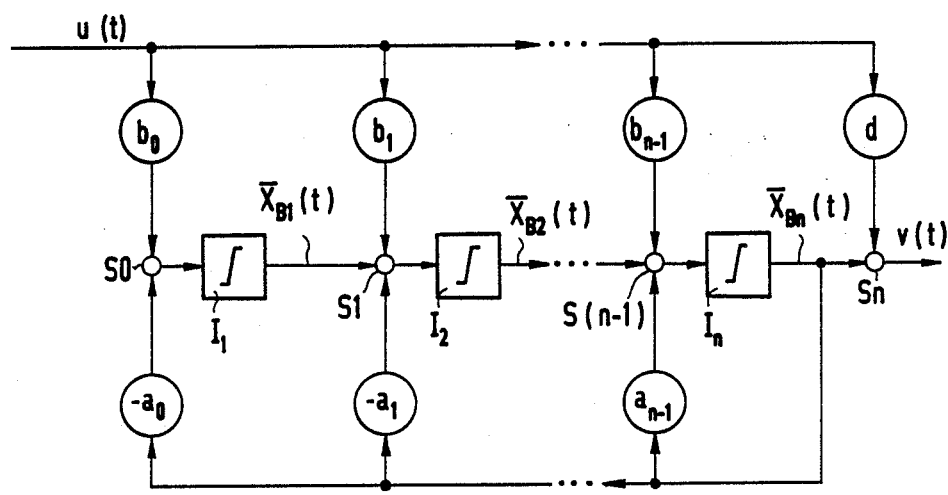
FIG. 6 shows the general structure of an $n_{th}$ order system model constructed in "observer standard form"

FIG. 6 shows by way of an example the general structure of a system model of the $n_{th}$ order in the time domain constructed in the so-called "observer standard form". As already explained above, the latter consists of a series circuit of n integrators, $I_1, I_2 ... I_n$. These are provided at their inputs via adding points S0, S1 ... S(n−1) with the input signal u weighted via the weighting factors $b_0, b_1...b_{n-1}$. Furthermore, the input value u, weighted as a "pass-through value" with the factor d via the adding point Sn is connected directly to the output signal $\bar{x}_{Bn}$ (t) of the series circuit of integrators and thus contributes without delay to the formation of the output signal v. It is seen that all integrators are fed back by feeding back the signal $\bar{x}_{Bn}$ (t) at the output of the integrator chain weighted with the factors $-a_0$, $-a_1... -a_{n-1}$ to the mixing point S0, S1... S(n−1) at the input of the respective integrators $I_1, I_2, ... I_n$. The trapezoidal rule integrating module according to the invention, which can be fed back, is particularly well suited to serve preferably in a sampling control system as an "integrator" in the practical implementation of a system model according to the basic block diagram of FIG. 6.

Figure 7:
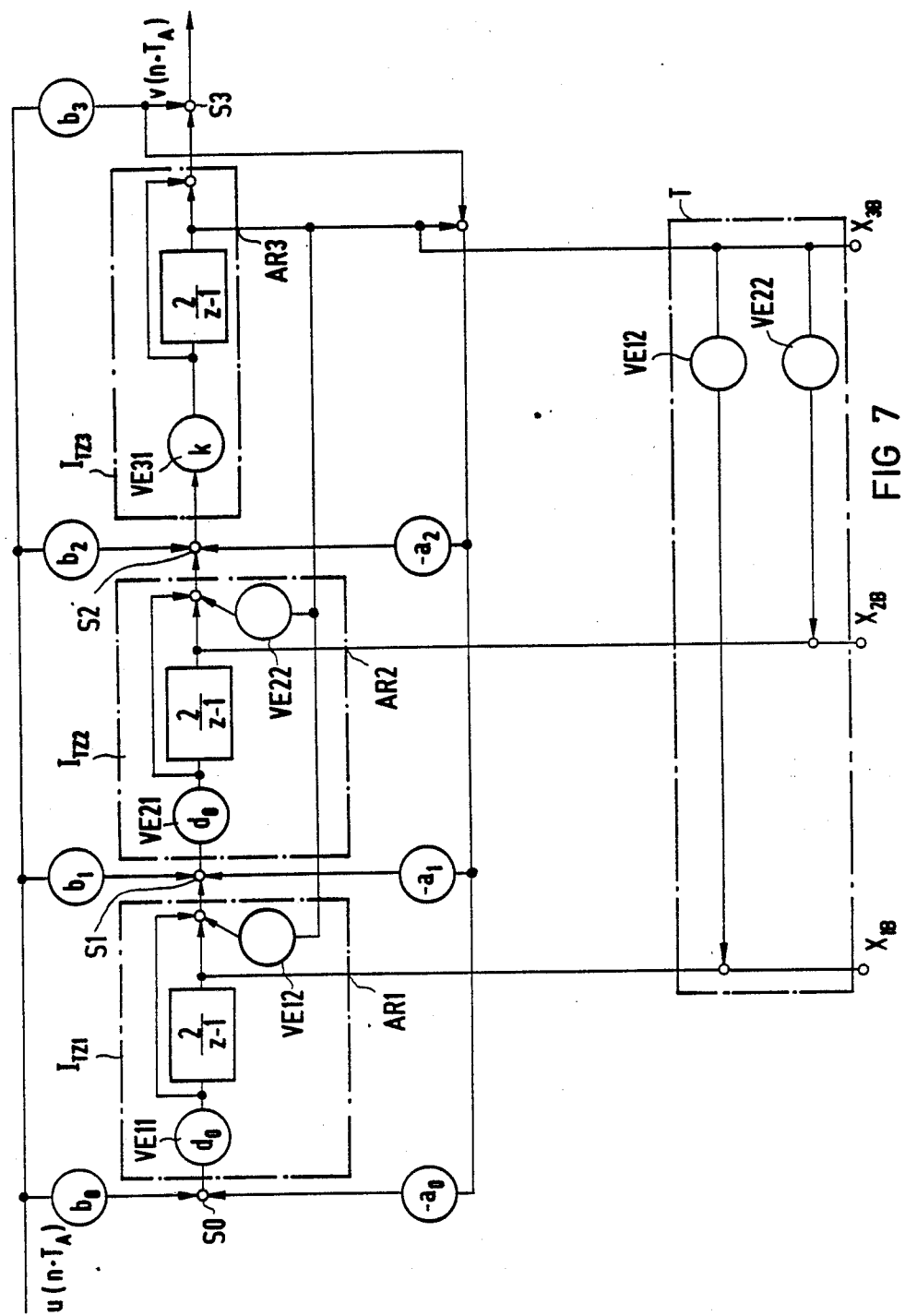
FIG. 7, by way of an example, shows a system model of the third order constructed in "observer standard form" using the trapezoidal rule integrating module according to the invention, which can be fed back.

In FIG. 7, an advantageous embodiment for a third-order system model in observer standard form is shown, using the trapezoidal rule integrating modules according to the invention, which can be fed back. This model therefore consists of the series circuit of three trapezoidal rule integrating modules $I_{TZ1}, I_{TZ2}, I_{TZ3}$. All integrators are fed back, using the signal at the feedback output AR3 of the third integrating module in the manner explained by the general example of FIG. 6, via the coefficients $-a_0, a_{-1}, a_{-2}$. The correction of the deviation of the signal at the feedback output from the output signal of the respective integrating module will be explained in greater detail by the example of the third module $I_{TZ3}$. According to the embodiment shown in FIG. 5, the correction is accomplished here by means of adjustment of a suitable correction value k at the amplified VE31, where $$k = d_0/(1 + h \cdot d_0)$$
$$h = a_2 + a_1 \cdot d_o + a_0 \cdot d_o^2.$$

The gain h is therefore obtained as the sum of the gains of three feedback branches. The first branch goes directly from the output to the input of the third integrator and contains the gain factor $a_2$.

The second feedback branch goes from the output of the third integrator indirectly via the pass-through value of the second integrator $I_{TZ2}$ to the input of the third integrator and contains the gain factor $-a_1 \cdot d_0$. The third feedback branch, finally, goes from the output of the third integrator indirectly via the pass-through values of the first and second integrators $I_{TZ1}, I_{TZ2}$ and contains the gain factor $-a_0 \cdot d_0 \cdot d_{o'}$.

In the other two integrating modules $I_{TZ1}, I_{TZ2}$ the correction is accomplished in a manner very similar to the embodiment of FIG. 4. The signal a the feedback output AR3 of the third integrator is connected here via amplifiers VE12, VE22, weighted, to the outputs of the respective integrating modules. The gain factors of the amplifiers are set according to the relations Ve 12: $-a_0 \cdot d_o$ VE 22: $-a_1 \cdot d_o - a_{00} d_o^2$.

From the structure of FIG. 7, the corresponding state variables $X_{1B}, X_{2B}, X_{3B}$ can be simulated by means of a transformation network T directly from the signals at the feedback outputs AR1, AR2, AR3 of the trapezoidal rule integrating modules $I_{TZ1}, I_{TZ2}, I_{TZ3}$ according to the invention. For correcting the deviations between the signals at the respective feedback outputs from the output signals proper, also the weighting factor known from the amplifiers VE12, V22 must be taken into account also in the transformation network T for the first and second integrator.

It is a particular advantage of the trapezoidal rule integrating module according to the invention, which can be fed back that, for maintaining stability, the minimal system time constant to be simulated needs to be only larger than or equal to 0.5 − times the sampling time $T_A$ present, in contrast to the rectangle rule integrating module. It is a further advantage of the module according to the invention that it can be used not only for the design of system models or observers in the state space standard forms which presume linearity of the system to be modulated and are regularly structured; rather, also nonlinear structures can also be constructed modularly in a manner individually adapted to the individual existing conditions.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. An integrating module for a sampling control device which can be fed back and in which the relation between the input and the output signals at every sampling instant is determined by a recursive integrating algorithm which is formed by the approximation of the area under a continuous function by means of the trapezoidal rule, comprising:
    an internal rectangle rule integrating module, in which the relationship between the input and the output signal at every sampling instant is determined by a recursive integrating algorithm which is formed by the approximation of the area under a continuous function by means of the rectangle rule; wherein
    a first amplifier which weights the input signal of the integrating module with the first factor $d_0 = T_A/2 \times T_I$, where $T_A$=sampling time and $T_I$=integration time constant and makes it available as the input signal for the internal rectangle rule integrating module and as a pass-through value;
    a first adder which forms as the output signal of the integrating module the sum of the pass-through value and twice the output signal of the internal rectangle rule integrating module;
    a separate feedback output at which twice the output signal of the internal rectangle rule integrating module is delivered; and
    means for correcting the deviation of the signal at the feedback output from the output signal if feedback from the feedback output to the input of the integrating module is present.

2. The integrating module recited in claim 1, wherein the means for correcting the deviation of the signal of the feedback output from the output signal at the output of the integrating module comprises a second amplifier which weights the pass-through value with a second factor and connects it inverted to the input signal of the integrating module, where the second factor corresponds to the gain of a feedback from the feedback output to the input of the integrating module.

3. The integrating module recited in claim 1, wherein, for correcting the deviation of the signal at the feedback output from the output signal of the integrating module, the first factor of the first amplifier is chosen in accordance with the relation $d_o/(1+h \cdot d_o)$, where h = gain factor in a feedback from the feedback output to the input of the integrating module.

* * * * *